United States Patent
Kim et al.

(10) Patent No.: US 10,861,183 B2
(45) Date of Patent: Dec. 8, 2020

(54) METHOD AND DEVICE FOR SHORT-TERM PATH PLANNING OF AUTONOMOUS DRIVING THROUGH INFORMATION FUSION BY USING V2X COMMUNICATION AND IMAGE PROCESSING

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/724,475

(22) Filed: Dec. 23, 2019

(65) Prior Publication Data
US 2020/0250848 A1    Aug. 6, 2020

Related U.S. Application Data

(60) Provisional application No. 62/799,207, filed on Jan. 31, 2019.

(51) Int. Cl.
*H04W 4/44*     (2018.01)
*G06T 7/70*     (2017.01)
(Continued)

(52) U.S. Cl.
CPC ............. *G06T 7/70* (2017.01); *B60R 11/04* (2013.01); *G06K 9/00798* (2013.01);
(Continued)

(58) Field of Classification Search
CPC combination set(s) only.
See application file for complete search history.

(56) References Cited

U.S. PATENT DOCUMENTS 10,579,070 B1 *   3/2020   Konrardy ............... B60L 58/12
2013/0279392 A1 * 10/2013   Rubin ..................... H04W 4/40
                                                           370/312

(Continued)

*Primary Examiner* — Md N Haque
(74) *Attorney, Agent, or Firm* — Husch Blackwell LLP

(57) ABSTRACT

A method for planning an autonomous driving by using a V2X communication and an image processing under a road circumstance where both vehicles capable of the V2X communication and vehicles incapable of the V2X communication exist is provided. And the method includes steps of: (a) a computing device, corresponding to a subject autonomous vehicle, instructing a planning module to acquire recognition information on surrounding vehicles including (i) first vehicles capable of a V2X communication and (ii) second vehicles incapable of the V2X communication; (b) the computing device instructing the planning module to select an interfering vehicle among the surrounding vehicles; and (c) the computing device instructing the planning module to generate a potential interference prediction model, and to modify current optimized route information in order to evade a potential interfering action, to thereby generate updated optimized route information of the subject autonomous vehicle.

22 Claims, 5 Drawing Sheets

(51) Int. Cl.
*G06K 9/00* (2006.01)
*G06N 3/04* (2006.01)
*B60R 11/04* (2006.01)
*G06N 3/08* (2006.01)

(52) U.S. Cl.
CPC ......... *G06N 3/0427* (2013.01); *G06N 3/0454* (2013.01); *H04W 4/44* (2018.02); *G06N 3/08* (2013.01); *G06T 2207/20084* (2013.01); *G06T 2207/30256* (2013.01)

(56) References Cited

U.S. PATENT DOCUMENTS

| | | | |
|---|---|---|---|
| 2017/0025013 A1* | 1/2017 | Lee | G06K 9/00805 |
| 2017/0131114 A1* | 5/2017 | Li | G01C 21/32 |
| 2017/0178498 A1* | 6/2017 | Mcerlean | B60K 35/00 |
| 2019/0075566 A1* | 3/2019 | Kim | H04W 72/082 |
| 2019/0120649 A1* | 4/2019 | Seok | G01C 21/3608 |
| 2019/0287520 A1* | 9/2019 | Lee | G10L 13/043 |
| 2019/0378412 A1* | 12/2019 | Zhu | G05D 1/0088 |

* cited by examiner

METHOD AND DEVICE FOR SHORT-TERM PATH PLANNING OF AUTONOMOUS DRIVING THROUGH INFORMATION FUSION BY USING V2X COMMUNICATION AND IMAGE PROCESSING

CROSS REFERENCE OF RELATED APPLICATION

This application claims the benefit of priority to U.S. Provisional Patent Application No. 62/799,207, filed Jan. 31, 2019, the entire contents of which are incorporated herein by reference.

FIELD OF THE DISCLOSURE

The present disclosure relates to a method and a device for use with an autonomous vehicle; and more particularly, to the method and the device for a short-term path planning of an autonomous driving through a fusion of information, under a road circumstance where both vehicles capable of the V2X communication and vehicles incapable of the V2X communication exist.

BACKGROUND OF THE DISCLOSURE

Recently, autonomous driving technologies are attracting great attention. Therefore, it is expected that the autonomous driving technologies will be commercialized in the near future. However, many studies on such autonomous driving technologies have been focused on technologies for safely driving an autonomous vehicle by a computing device installed therein. In other words, technologies for interaction with other vehicles efficiently during the autonomous driving have not been considered much, while the technologies for safely driving itself are mainly considered.

However, since the amount of information that can be exchanged between vehicles has increased due to the development of communication technologies, it became important to use V2X technology to communicate with other vehicles. When a vehicle is driven using information generated by other vehicles, driving of the vehicle as well as other vehicles can be secured.

But, there are not many technologies to be used for planning the autonomous driving by actively using such V2X technology.

SUMMARY OF THE DISCLOSURE

It is an object of the present disclosure to solve all the aforementioned problems.

It is still another object of the present disclosure to provide a method for planning an autonomous driving by using a V2X communication and an image processing to allow the autonomous driving to be performed more safely.

In accordance with one aspect of the present disclosure, there is provided a method for planning an autonomous driving by using a Vehicle-to-everything (V2X) communication and an image processing under a road circumstance where both vehicles capable of the V2X communication and vehicles incapable of the V2X communication exist, including steps of: (a) a computing device instructing a planning module to acquire recognition information on at least part of surrounding vehicles including at least part of (i) a first group including one or more first vehicles which are capable of a V2X communication and are located closer than a threshold distance from a subject autonomous vehicle corresponding to the computing device and (ii) a second group including one or more second vehicles which are incapable of the V2X communication and are located closer than the threshold distance from the subject autonomous vehicle, by interworking with at least one of a V2X communication module and an image processing module; (b) the computing device instructing the planning module to select at least one interfering vehicle among the surrounding vehicles, whose probability of obstructing the subject autonomous vehicle is larger than a threshold probability, by referring to a current optimized route information of the subject autonomous vehicle and the recognition information; and (c) the computing device instructing the planning module to generate a potential interference prediction model on the interfering vehicle by interworking with at least one of the V2X communication module and the image processing module, and to modify the current optimized route information in order to evade a potential interfering action of the interfering vehicle, which is estimated by using the potential interference prediction model, to thereby generate updated optimized route information of the subject autonomous vehicle.

As one example, at the step of (a), the computing device instructs a 1-st neural network included in the image processing module to acquire at least one circumstance image, corresponding to at least one direction from the subject autonomous vehicle, through at least one camera installed to the subject autonomous vehicle, and to apply one or more 1-st neural network operations to the circumstance image, to thereby generate the recognition information and then to thereby transmit the recognition information to the planning module, wherein the recognition information includes at least part of (i) vehicle identifier information, (ii) vehicle exterior information, and (iii) vehicle relative location information from the subject autonomous vehicle.

As one example, at the step of (b), the computing device instructs the planning module to (i) generate a scheduled direction vector by using scheduled direction information on a direction to which the subject autonomous vehicle is planned to move in a threshold time and generate one or more relative location vectors by using the vehicle relative location information corresponding to at least part of the surrounding vehicles, (ii) generate each of similarity scores between the scheduled direction vector and each of the relative location vectors, and (iii) select at least one specific surrounding vehicle, among the surrounding vehicles, as the interfering vehicle, whose specific similarity score is larger than a threshold similarity score.

As one example, at the step of (b), the computing device instructs the planning module to select at least one specific surrounding vehicle, whose corresponding partial image is located in a current lane region, corresponding to a current lane of a road including the subject autonomous vehicle, of the circumstance image, as the interfering vehicle, by referring to information on locations, of bounding boxes including the surrounding vehicles, on the circumstance image, which is acquired by using the image processing module.

As one example, at the step of (c), the computing device, if the interfering vehicle belongs to the second group, (i) instructs the image processing module (i-1) to acquire a modeling image including the interfering vehicle through at least one camera installed to the subject autonomous vehicle and (i-2) to apply one or more 2-nd neural network operations to the modeling image, to thereby generate acceleration capability information of the interfering vehicle, and then to thereby transmit the acceleration capability information to the planning module, and (ii) instructs the planning module to generate the potential interference prediction model by referring to the acceleration capability information and current velocity information of the interfering vehicle acquired by using at least one of the image processing module and the V2X communication module.

As one example, at the step of (c), the computing device instructs a 2-nd neural network included in the image processing module to apply one or more (2-1)-st neural network operations, among the 2-nd neural network operations, to the modeling image by additionally referring to a self-vehicle velocity information of the subject autonomous vehicle, to thereby generate (i) relative velocity information of the interfering vehicle in relation to the subject autonomous vehicle, (ii) category information corresponding to a class of the interfering vehicle, and (iii) acceleration variable information corresponding to at least part of a mass and a volume of the interfering vehicle, and instructs the 2-nd neural network to apply one or more (2-2)-nd neural network operations, among the 2-nd neural network operations, to a concatenated vector including the relative velocity information, the category information and the acceleration variable information as its components, to thereby generate the acceleration capability information of the interfering vehicle.

As one example, at the step of (c), the computing device instructs the 2-nd neural network to apply the (2-2)-nd neural network operations to the concatenated vector, further including current section average velocity information on an average velocity of vehicles in a current section of a road where the surrounding vehicles and the subject autonomous vehicle are driving currently, to thereby generate the acceleration capability information.

As one example, the computing device instructs the planning module to generate the potential interference prediction model by referring to the acceleration capability information and the current velocity information, generated by referring to velocity ratio information of the interfering vehicle and current section average velocity information, wherein the velocity ratio information has been generated by comparing each of average velocities for each of past sections of a road, where the surrounding vehicles and the subject autonomous vehicle have been driving, with each of velocities of the interfering vehicle in each of the past sections, and transmitted from a center server to the V2X communication module, and the current section average velocity information has been generated by calculating an average velocity of vehicles in a current section of a road where the surrounding vehicles and the subject autonomous vehicle are driving currently, and transmitted from the center server to the V2X communication module.

As one example, the computing device instructs the 2-nd neural network to apply the 2-nd neural network operations to the modeling image, to thereby generate the current velocity information along with the acceleration capability information and then to thereby transmit the current velocity information and the acceleration capability information to the planning module, and instructs the planning module to generate the potential interference prediction model by referring to the current velocity information and the acceleration capability information.

As one example, the computing device instructs the planning module to generate estimated velocity range information by referring to (i) a TTC value corresponding to a time for the subject autonomous vehicle to evade the potential interfering action, (ii) the acceleration capability information and (iii) the current velocity information, to thereby generate the potential interference prediction model including the estimated velocity range information.

As one example, at the step of (c), the computing device, if the interfering vehicle belongs to the second group, instructs the V2X communication module to (i) acquire (i-1) acceleration capability information of the interfering vehicle, (i-2) velocity ratio information of the interfering vehicle generated by comparing each of average velocities for each of past sections of a road, where the surrounding vehicles and the subject autonomous vehicle have been driving, with each of velocities of the interfering vehicle in each of the past sections, and (i-3) the current section average velocity information generated by calculating an average velocity of vehicles in the current section, from the center server, (ii) generate current velocity information of the interfering vehicle by referring to the velocity ratio information and the current section average velocity information, and (iii) generate the potential interference prediction model by referring to the current velocity information and the acceleration capability information.

As one example, at the step of (c), the computing device, if the interfering vehicle belongs to the first group, instructs the V2X communication module to acquire scheduled route information of the interfering vehicle by communicating with the interfering vehicle, and instructs the planning module to generate the potential interference prediction model by referring to the scheduled route information.

As one example, at the step of (c), the computing device instructs the planning module to acquire lane average velocity information of at least one surrounding lane located in at least one of a left side and a right side of a current lane including the subject autonomous vehicle, and to modify the current optimized route information in order to add an evading action, to be executed in correspondence with the surrounding lane in order to evade the potential interfering action, by referring to the lane average velocity information, to thereby generate the updated optimized route information.

In accordance with another aspect of the present disclosure, there is provided a computing device for planning an autonomous driving by using a Vehicle-to-everything (V2X) communication and an image processing under a road circumstance where both vehicles capable of the V2X communication and vehicles incapable of the V2X communication exist, including: at least one memory that stores instructions; and at least one processor configured to execute the instructions to perform processes of: (I) instructing a planning module to acquire recognition information on at least part of surrounding vehicles including at least part of (i) a first group including one or more first vehicles which are capable of a V2X communication and are located closer than a threshold distance from a subject autonomous vehicle corresponding to the computing device and (ii) a second group including one or more second vehicles which are incapable of the V2X communication and are located closer than the threshold distance from the subject autonomous vehicle, by interworking with at least one of a V2X communication module and an image processing module; (II) instructing the planning module to select at least one interfering vehicle among the surrounding vehicles, whose probability of obstructing the subject autonomous vehicle is larger than a threshold probability, by referring to a current optimized route information of the subject autonomous vehicle and the recognition information; and (III) instructing the planning module to generate a potential interference prediction model on the interfering vehicle by interworking with at least one of the V2X communication module and the image processing module, and to modify the current optimized route information in order to evade a potential interfering action of the interfering vehicle, which is estimated by using the potential interference prediction model, to thereby generate updated optimized route information of the subject autonomous vehicle.

As one example, at the process of (I), the processor instructs a 1-st neural network included in the image processing module to acquire at least one circumstance image, corresponding to at least one direction from the subject autonomous vehicle, through at least one camera installed to the subject autonomous vehicle, and to apply one or more 1-st neural network operations to the circumstance image, to thereby generate the recognition information and then to thereby transmit the recognition information to the planning module, wherein the recognition information includes at least part of (i) vehicle identifier information, (ii) vehicle exterior information, and (iii) vehicle relative location information from the subject autonomous vehicle.

As one example, at the process of (II), the processor instructs the planning module to (i) generate a scheduled direction vector by using scheduled direction information on a direction to which the subject autonomous vehicle is planned to move in a threshold time and generate one or more relative location vectors by using the vehicle relative location information corresponding to at least part of the surrounding vehicles, (ii) generate each of similarity scores between the scheduled direction vector and each of the relative location vectors, and (iii) select at least one specific surrounding vehicle, among the surrounding vehicles, as the interfering vehicle, whose specific similarity score is larger than a threshold similarity score.

As one example, at the process of (II), the processor instructs the planning module to select at least one specific surrounding vehicle, whose corresponding partial image is located in a current lane region, corresponding to a current lane of a road including the subject autonomous vehicle, of the circumstance image, as the interfering vehicle, by referring to information on locations, of bounding boxes including the surrounding vehicles, on the circumstance image, which is acquired by using the image processing module.

As one example, at the process of (III), the processor, if the interfering vehicle belongs to the second group, (i) instructs the image processing module (i-1) to acquire a modeling image including the interfering vehicle through at least one camera installed to the subject autonomous vehicle and (i-2) to apply one or more 2-nd neural network operations to the modeling image, to thereby generate acceleration capability information of the interfering vehicle, and then to thereby transmit the acceleration capability information to the planning module, and (ii) instructs the planning module to generate the potential interference prediction model by referring to the acceleration capability information and current velocity information of the interfering vehicle acquired by using at least one of the image processing module and the V2X communication module.

As one example, at the process of (III), the processor instructs a 2-nd neural network included in the image processing module to apply one or more (2-1)-st neural network operations, among the 2-nd neural network operations, to the modeling image by additionally referring to a self-vehicle velocity information of the subject autonomous vehicle, to thereby generate (i) relative velocity information of the interfering vehicle in relation to the subject autonomous vehicle, (ii) category information corresponding to a class of the interfering vehicle, and (iii) acceleration variable information corresponding to at least part of a mass and a volume of the interfering vehicle, and instructs the 2-nd neural network to apply one or more (2-2)-nd neural network operations, among the 2-nd neural network operations, to a concatenated vector including the relative velocity information, the category information and the acceleration variable information as its components, to thereby generate the acceleration capability information of the interfering vehicle.

As one example, at the process of (III), the processor instructs the 2-nd neural network to apply the (2-2)-nd neural network operations to the concatenated vector, further including current section average velocity information on an average velocity of vehicles in a current section of a road where the surrounding vehicles and the subject autonomous vehicle are driving currently, to thereby generate the acceleration capability information.

As one example, the processor instructs the planning module to generate the potential interference prediction model by referring to the acceleration capability information and the current velocity information, generated by referring to velocity ratio information of the interfering vehicle and current section average velocity information, wherein the velocity ratio information has been generated by comparing each of average velocities for each of past sections of a road, where the surrounding vehicles and the subject autonomous vehicle have been driving, with each of velocities of the interfering vehicle in each of the past sections, and transmitted from a center server to the V2X communication module, and the current section average velocity information has been generated by calculating an average velocity of vehicles in a current section of a road where the surrounding vehicles and the subject autonomous vehicle are driving currently, and transmitted from the center server to the V2X communication module.

As one example, the processor instructs the 2-nd neural network to apply the 2-nd neural network operations to the modeling image, to thereby generate the current velocity information along with the acceleration capability information and then to thereby transmit the current velocity information and the acceleration capability information to the planning module, and instructs the planning module to generate the potential interference prediction model by referring to the current velocity information and the acceleration capability information.

As one example, the processor instructs the planning module to generate estimated velocity range information by referring to (i) a TTC value corresponding to a time for the subject autonomous vehicle to evade the potential interfering action, (ii) the acceleration capability information and (iii) the current velocity information, to thereby generate the potential interference prediction model including the estimated velocity range information.

As one example, at the process of (III), the processor, if the interfering vehicle belongs to the second group, instructs the V2X communication module to (i) acquire (i-1) acceleration capability information of the interfering vehicle, (i-2) velocity ratio information of the interfering vehicle generated by comparing each of average velocities for each of past sections of a road, where the surrounding vehicles and the subject autonomous vehicle have been driving, with each of velocities of the interfering vehicle in each of the past sections, and (i-3) the current section average velocity information generated by calculating an average velocity of vehicles in the current section, from the center server, (ii) generate current velocity information of the interfering vehicle by referring to the velocity ratio information and the current section average velocity information, and (iii) generate the potential interference prediction model by referring to the current velocity information and the acceleration capability information.

As one example, at the process of (III), the processor, if the interfering vehicle belongs to the first group, instructs the V2X communication module to acquire scheduled route information of the interfering vehicle by communicating with the interfering vehicle, and instructs the planning module to generate the potential interference prediction model by referring to the scheduled route information.

As one example, at the process of (III), the processor instructs the planning module to acquire lane average velocity information of at least one surrounding lane located in at least one of a left side and a right side of a current lane including the subject autonomous vehicle, and to modify the current optimized route information in order to add an evading action, to be executed in correspondence with the surrounding lane in order to evade the potential interfering action, by referring to the lane average velocity information, to thereby generate the updated optimized route information.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
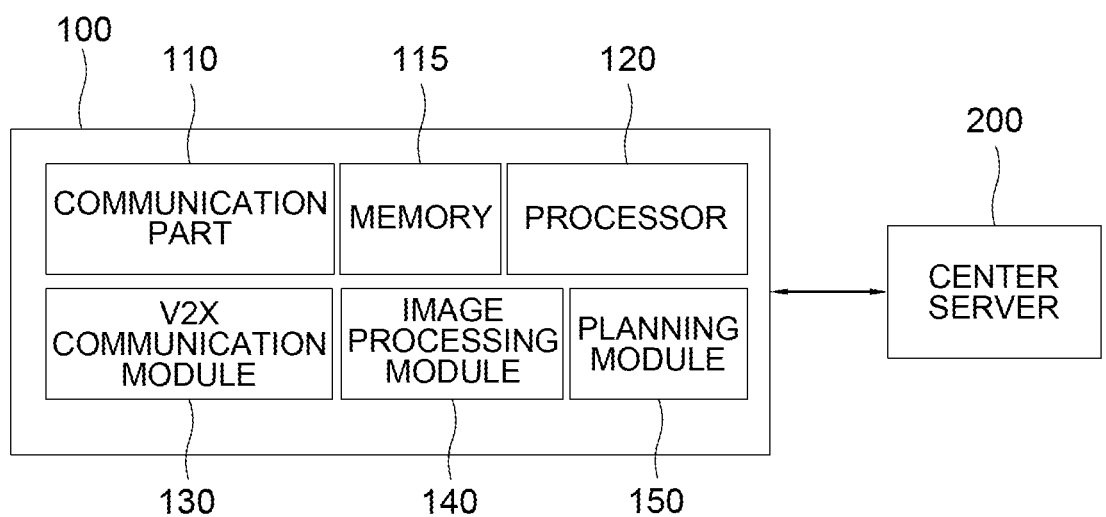
FIG. 1 is a drawing schematically illustrating a configuration of a computing device performing a method for planning an autonomous driving by using a V2X communication and an image processing under a road circumstance where both vehicles capable of the V2X communication and vehicles incapable of the V2X communication exist in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

FIG. 1 is a drawing schematically illustrating a configuration of a computing device performing a method for planning an autonomous driving by using a V2X communication and an image processing under a road circumstance where both vehicles capable of the V2X communication and vehicles incapable of the V2X communication exist in accordance with one example embodiment of the present disclosure.

By referring to FIG. 1, the computing device 100 may include at least one V2X communication module 130, at least one image processing module 140, and at least one planning module 150, which are components to be described later. Inputting/outputting processes and operation processes of the V2X communication module 130, the image processing module 140, and the planning module 150 may be performed by at least one communication part 110 and at least one processor 120, respectively. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

Such computing device 100 may be included in a subject autonomous vehicle, or included in a control server configured to control the subject autonomous vehicle through a remote wireless communication.

Also, the computing device 100 may interwork with a center server 200 through a communication. That is, to be explained later, the planning method of the present disclosure includes a method for acquiring information on at least one interfering vehicle around the subject autonomous vehicle, even when the interfering vehicle is incapable of the V2X communication, by interworking with the center server 200.

As seen above, the configuration of the computing device 100 performing the planning method in accordance with one example embodiment of the present disclosure has been explained. Below, a brief explanation on the planning method of the present disclosure will be provided.

First, the computing device 100 may instruct the planning module 150 to interwork with at least one of the V2X communication module 130 and the image processing module 140, to thereby acquire recognition information on at least part of surrounding vehicles. Herein, the surrounding vehicles may include at least part of a first group including one or more first vehicles capable of the V2X communication and located closer than a threshold distance from the subject autonomous vehicle, and a second group including one or more second vehicles incapable of the V2X communication and also located closer than the threshold distance from the subject autonomous vehicle.

Thereafter, the computing device may instruct the planning module 150 to select said interfering vehicle, among the surrounding vehicles, by referring to the recognition information and current optimized route information of the subject autonomous vehicle. Herein, the interfering vehicle may be one of the surrounding vehicles whose probability of obstructing the subject autonomous vehicle is larger than a threshold probability.

And, the computing device 100 may instruct the planning module 150 to generate a potential interference prediction model on the interfering vehicle by interworking with at least one of the V2X communication module 130 and the image processing module 140. After that, the computing device 100 may instruct the planning module 150 to modify the current optimized route information in order to evade a potential interfering action of the interfering vehicle, which is estimated by using the potential interference prediction model, to thereby generate updated optimized route information of the subject autonomous vehicle. Such updated optimized route information can be used for planning the autonomous driving.

It has been briefly shown how to perform the planning method of the present disclosure. Below, it will be explained more specifically.

As a first step for performing the planning method of the present disclosure, in order to acquire recognition information, the computing device 100 may instruct the planning module 150 to interwork with V2X communication module 130 or the image processing module 140. First, how the planning module 150 interworks with the image processing module 140 will be explained below.

That is, the computing device 100 may instruct a 1-st neural network included in the image processing module 140 to acquire at least one circumstance image, corresponding to at least one direction from the subject autonomous vehicle, through at least one camera installed in the subject autonomous vehicle. After such circumstance image has been acquired, the computing device 100 may instruct the 1-st neural network to apply one or more 1-st neural network operations to the circumstance image, to thereby generate the recognition information. As an example, the 1-st neural network may include at least one 1-st convolutional layer, at least one 1-st pooling layer, and at least one 1-st FC layer, and may interwork with a 1-st RPN. Also, it may have been trained by using at least one 1-st training image and its corresponding at least one 1-st GT before performing the planning method of the present disclosure. Herein, the 1-st neural network operations may be operations, performed by the 1-st convolutional layer, the 1-st pooling layer and the 1-st FC layer, applied to the circumstance image inputted to the 1-st neural network.

Herein, the recognition information, generated through such processes of the 1-st neural network, may include at least part of (i) vehicle identifier information, (ii) vehicle exterior information, and (iii) vehicle relative location information from the subject autonomous vehicle. As one example, the vehicle identifier information may include information on one or more registration numbers of the surrounding vehicles, acquired by referring to partial images of license plates of the surrounding vehicles, included in the circumstance image. And, the vehicle exterior information include information on one or more colors, one or more shapes and one or more classes of the surrounding vehicles. Also, the vehicle relative location information may include information on one or more relative coordinates of the surrounding vehicles, including one or more longitudinal distances and one or more lateral distances as their components, in relation to the subject autonomous vehicle. As shown above, the recognition information can be acquired through the image processing module 140.

Below, how the recognition information is acquired by the V2X communication module 130 may be explained. The computing device 100 may instruct the V2X communication module to communicate with specific surrounding vehicles of the first group, and acquire recognition information on the specific surrounding vehicles. By using the V2X communication module 130, the recognition information may be acquired more accurately, but it can be only usable for the specific surrounding vehicles belonging to the first group.

The recognition information can be acquired through such two ways, by using the image processing module 140 or the V2X communication module 130. Below, how to select the interfering vehicle among the surrounding vehicles will be presented.

First, the computing device 100 may instruct the planning module 150 to select the interfering vehicle by referring to the current optimized route information and the recognition information. The current optimized route information may include information on a scheduled route of the subject autonomous vehicle planned beforehand, which may be modified after the interfering vehicle is recognized. Specifically, the computing device 100 may instruct the planning module 150 to generate a scheduled direction vector by using scheduled direction information on a direction to which the subject autonomous vehicle is planned to move in a threshold time. Also, the computing device 100 may instruct the planning module 150 to generate one or more relative location vectors by using the vehicle relative location information corresponding to at least part of the surrounding vehicles. Thereafter, the computing device 100 may instruct the planning module 150 to generate each of similarity scores between the scheduled direction vector and each of the relative location vectors, and select at least one specific surrounding vehicle, among the surrounding vehicles, as the interfering vehicle, whose corresponding specific similarity score is larger than a threshold similarity score.

To be simple, the specific surrounding vehicle, located in a direction where the subject autonomous vehicle is scheduled to move, is selected as the interfering vehicle, and the specific surrounding vehicle is selected by comparing the scheduled direction vector and the relative location vectors. Below, FIG. 2 will be referred to, in order to explain such process more specifically.

Figure 2:
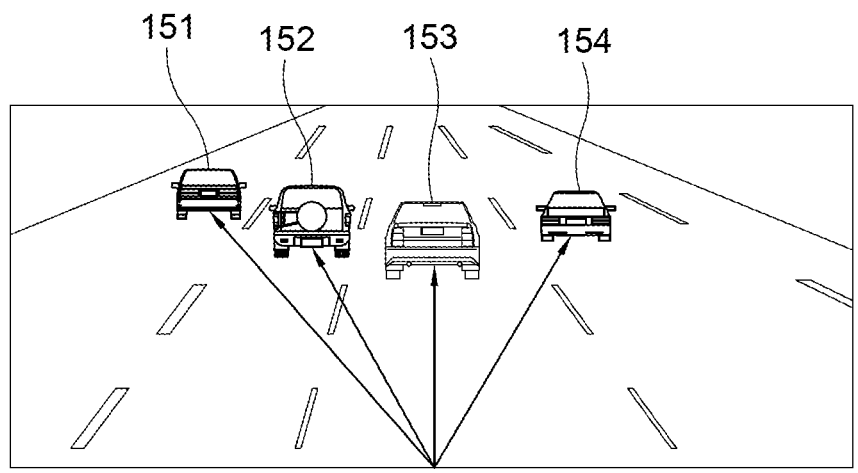
FIG. 2 is a drawing schematically illustrating how to select an interfering vehicle to perform the method for planning the autonomous driving by using the V2X communication and the image processing under the road circumstance where both the vehicles capable of the V2X communication and the vehicles incapable of the V2X communication exist in accordance with one example embodiment of the present disclosure.

FIG. 2 is a drawing schematically illustrating how to select an interfering vehicle to perform the method for planning the autonomous driving by using the V2X communication and the image processing under the road circumstance where both the vehicles capable of the V2X communication and the vehicles incapable of the V2X communication exist in accordance with one example embodiment of the present disclosure.

By referring to FIG. 2, a first relative location vector 151, a second relative location vector 152, a third relative location vector 153 and a fourth relative location vector 154 may be seen. Herein, if the current optimized route information correspond to a straight driving in the threshold time, the specific surrounding vehicle corresponding to the third relative location vector may be selected as the interfering vehicle.

Different from said processes, another example embodiment for selecting the interfering vehicle by interworking with the image processing module 140 will be presented below.

For this example embodiment, the computing device 100 may instruct the first neural network to generate information on locations, of bounding boxes including the surrounding vehicles, on the circumstance image and information on a current lane region, corresponding to a current lane of a road including the subject autonomous vehicle, of the circumstance image, along with the recognition information. Such first neural network can be established by adding some nodes in its final layer for outputting such pieces of information, and making adjusted GT including ground-truth information on the locations of the bounding boxes and the information on the current lane region to be used for training the first neural network.

Thereafter, the computing device 100 may instruct the planning module 150 to determine whether each of partial images of the surrounding vehicles, i.e., each of regions of the circumstance image corresponding to each of the bounding boxes, is located in the current lane region or not, to find out whether the surrounding vehicles are running in the current lane or not, and select the specific surrounding vehicle running in the current lane as the interfering vehicle. Such example embodiment may be applied in case the subject autonomous vehicle is driving in the straight direction.

The interfering vehicle can be selected as shown above. Below, how to generate the potential interference prediction model will be presented. For generating the potential interference prediction model, there can be different embodiments, which are distinct in their usage of V2X communication module 130 and the image processing module 140. Such different embodiments will be explained in order, case by case.

To begin with, a first example embodiment for a case of the interfering vehicle belonging to the first group, thus using the V2X communication module 130 in priority, will be explained. If the subject autonomous vehicle is capable of communicating with the interfering vehicle of the first group, the computing device 100 may instruct the V2X communication module 130 to communicate with the interfering vehicle, to thereby acquire scheduled route information of the interfering vehicle, and then to thereby generate the potential interference prediction model by using the scheduled route information.

More specifically, if the interfering vehicle belongs to the first group and capable of the autonomous driving, the interfering vehicle may transmit its own current optimized route information as the scheduled route information to the computing device 100. In this case, the computing device 100 may instruct the planning module 150 to generate the potential interference prediction model by referring to estimated velocity range information included in the scheduled route information. On the contrary, if the interfering vehicle belongs to the first group but incapable of the autonomous driving, the interfering vehicle may transmit its current velocity information and its acceleration capability information to the computing device 100, and the computing device 100 may instruct the planning module 150 to generate the potential interference prediction model by using the current velocity information and the acceleration capability information. How the current velocity information and the acceleration capability information are used to generate the potential interference prediction model will be presented later.

Besides, a second example embodiment, corresponding to a case of the interfering vehicle belonging to the second group, may include three subordinate example embodiments, i.e., a (2-1)-st example embodiment corresponding to both of the V2X communication module 130 and the image processing module 140, a (2-2)-nd example embodiment corresponding to the image processing module 140, and a (2-3)-rd example embodiment corresponding to the V2X communication module 130. First, the (2-1)-st example embodiment will be explained below.

For the (2-1)-st example embodiment, the computing device 100 may instruct the image processing module 140 to acquire at least one modeling image including the interfering vehicle through the camera installed in the subject autonomous vehicle. The modeling image may be same as the circumstance image, or may be a newly acquired image including the interfering vehicle, photographed later than the circumstance image. Thereafter, the computing device 100 may instruct a 2-nd neural network included in the image processing module 140 to apply one or more 2-nd neural network operations to the modeling image, to thereby generate the acceleration capability information and transmit it to the planning module 150. In order to explain such 2-nd neural network and the 2-nd neural network operations, FIG. 3 will be referred to.

Figure 3:
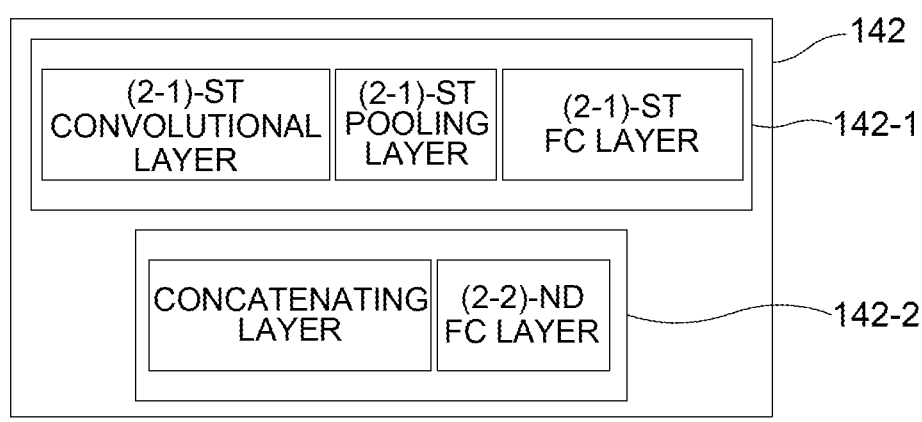
FIG. 3 is a drawing schematically illustrating a 2-nd neural network used for performing the method for planning the autonomous driving by using the V2X communication and the image processing under the road circumstance where both the vehicles capable of the V2X communication and the vehicles incapable of the V2X communication exist in accordance with one example embodiment of the present disclosure.

FIG. 3 is a drawing schematically illustrating a 2-nd neural network used for performing the method for planning the autonomous driving by using the V2X communication and the image processing under the road circumstance where both the vehicles capable of the V2X communication and the vehicles incapable of the V2X communication exist in accordance with one example embodiment of the present disclosure.

By referring to FIG. 3, the 2-nd neural network 142 may include at least one (2-1)-st neural network 142-1 and at least one (2-2)-nd neural network 142-2. And the (2-1)-st neural network 142-1 may include at least one (2-1)-st convolutional layer, at least one (2-1)-st pooling layer and at least one (2-1)-st FC layer, and may be assisted by a second RPN (not shown). Also, the (2-2)-nd neural network 142-2 may include a concatenating layer and a (2-2)-nd FC layer. Such (2-1)-st neural network 142-1 and the (2-2)-nd neural network 142-2 may be trained by using at least one 2-nd training image and its corresponding at least one 2-nd GT before performing the planning method of the present disclosure. Herein, the 2-nd neural network operations may be applied to the modeling image so that operations of the (2-1)-st neural network 142-1 and the (2-2)-nd neural network 142-2 are applied to the modeling image in order.

More specifically, if the modeling image is inputted to the (2-1)-st neural network 142-1, operations of the (2-1)-st convolutional layer, the (2-1)-st pooling layer and the (2-1)-st FC layer are applied to the modeling image in order, to thereby generate (i) relative velocity information of the interfering vehicle in relation to the subject autonomous vehicle, (ii) category information corresponding to a class of the interfering vehicle, and (iii) acceleration variable information corresponding to at least part of a mass and a volume of the interfering vehicle. Thereafter, if the relative velocity information, the category information, the acceleration variable information, and further current section average velocity information acquired by V2X communication module 130 from the center server 200, to be explained later, are inputted to the (2-2)-nd neural network 142-2, a concatenated vector including the relative velocity information, the category information, the acceleration variable information, and the current section average velocity information as its components can be generated by the concatenating layer, and the acceleration capability information can be generated by applying operations of the (2-2)-nd FC layer to the concatenated vector.

Herein, in order to generate the potential interference prediction model, other than the acceleration capability information, the current velocity information is further needed. Thus, how to acquire the current velocity information will be explained below. In the (2-1)-st example embodiment, it may be acquired by interworking with the V2X communication module.

The computing device 100 may instruct the V2X communication module 130 to acquire velocity ratio information and the current section average velocity information, generated by the center server 200. Herein, the velocity ratio information may have been generated by comparing each of average velocities for each of past sections of a road, where the surrounding vehicles and the subject autonomous vehicle have been driving, with each of velocities of the interfering vehicle in each of the past sections. Also, the current section average velocity information may have been generated by calculating an average velocity of vehicles in a current section of a road where the surrounding vehicles and the subject autonomous vehicle are driving currently. Such current section average velocity information and the velocity ratio information can be referred to, in order to generate the current velocity information of the interfering vehicle. To explain such process, FIG. 4 will be referred to.

Figure 4:
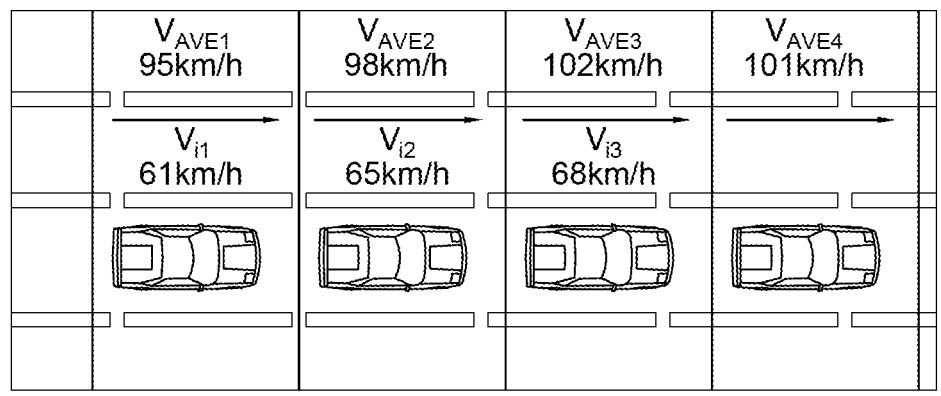
FIG. 4 is a drawing schematically illustrating how current velocity information of the interfering vehicle is generated by using current section average velocity information, to be used for performing the method for planning the autonomous driving by using the V2X communication and the image processing under the road circumstance where both the vehicles capable of the V2X communication and the vehicles incapable of the V2X communication exist in accordance with one example embodiment of the present disclosure.

FIG. 4 is a drawing schematically illustrating how current velocity information of the interfering vehicle is generated by using current section average velocity information, to be used for performing the method for planning the autonomous driving by using the V2X communication and the image processing under the road circumstance where both the vehicles capable of the V2X communication and the vehicles incapable of the V2X communication exist in accordance with one example embodiment of the present disclosure.

By referring to FIG. 4, it can be seen that, a first velocity ($V_{i1}$) of the interfering vehicle in a first section is 61 km/h, a second velocity ($V_{i2}$) of the interfering vehicle in a second section is 65 km/h, and a third velocity ($V_{i3}$) of the interfering vehicle in a third section is 68 km/h while a first average velocity ($V_{AVE1}$) of the first section is 95 km/h, a second average velocity ($V_{AVE2}$) of the second section is 98 km/h, and a third average velocity ($V_{AVE3}$) of the third section is 102 km/h. In this case, the velocity ratio information can be generated as 61+65+68/95+98+102=0.64, and the current velocity information can be generated as 101 km/h×0.64=64.64 km/h, since the a fourth average velocity ($V_{AVE4}$) of a fourth section, which is a current section, is 101 km/h.

Such current section average velocity information and the velocity ratio information may be generated by using each of cameras installed in each of points dividing each of sections. Specifically, the center server 200 may be able to (i) specify each of passing vehicles by using information on their registration numbers and their exteriors, (ii) calculate times spent for covering each of the sections in order to measure each of their velocities, and thus (iii) generate section average velocity information on each of the sections, including the current section average information. For the velocity ratio information of the interfering vehicle, general velocity ratio information for each of passing vehicles may have been prepared for each of the sections by using each of piece of the section average velocity information. Since the general velocity ratio information for all of the passing vehicles is prepared, if the center server 200 acquires information for specifying the interfering vehicle among the passing vehicles, such as the vehicle identifier information and the vehicle exterior information, from the V2X communication module 130, the velocity ratio information for the interfering vehicle, among the general velocity ratio information, may be selected and transmitted to the computing device 100.

After such current velocity information is acquired, it can be referred to along with the acceleration capability information, to thereby generate the potential interference prediction model.

The (2-1)-st example embodiment is as shown above. Below, the (2-2)-nd example embodiment corresponding to the image processing module 140 will be presented.

For the (2-2)-nd example embodiment, the 2-nd neural network 142 may have been configured to have one more node for outputting the current velocity information in the (2-2)-nd FC layer, and may have been trained by using a modified 2-nd GT including GT current velocity information. In this case, the computing device 100 may instruct the 2-nd neural network included in the image processing module 140 to apply the 2-nd neural network operations to the modeling image, to thereby generate the current velocity information along with the acceleration capability information and then to thereby transmit the current velocity information and the acceleration capability information to the planning module 150. Thereafter, the computing device may instruct the planning module 150 to generate the potential interference prediction model by referring to the current velocity information and the acceleration capability information.

For the (2-3)-rd example embodiment, the V2X communication module 130 may be mainly used to acquire the acceleration capability information and the current velocity information. That is, the computing device 100 may instruct the V2X communication module 130 to communicate with the center server 200 to acquire the acceleration capability information, the velocity ratio information and the current section average velocity information. Thereafter, the computing device 100 may instruct the V2X communication module to transmit the acceleration capability information of the interfering vehicle and the current velocity information of the interfering vehicle calculated by using the velocity ratio information and the current section average velocity information, and may instruct the planning module 150 to generate the potential interference prediction model by referring to the acceleration capability information and the current velocity information. In this example embodiment, the center server 200 may acquire information on categories and loadages of the passing vehicles including the interfering vehicle by using each of the cameras installed in points between each of the sections, to thereby generate the acceleration capability information, and then to thereby transmit it to the computing device 100.

After the acceleration capability information and the current velocity information are acquired by using methods corresponding to the example embodiments, the computing device 100 may instruct the planning module 150 to generate estimated velocity range information by referring to (i) a TTC value corresponding to a time for the subject autonomous vehicle to evade the potential interfering action, (ii) the acceleration capability information and (iii) the current velocity information, to thereby generate the potential interference prediction model including the estimated velocity range information.

$$V_{range} = \{v | V_{current} - A \times TTC \leq v \leq V_{current} + A \times TTC\}$$

where $V_{current} = \omega V_{road}$ and $\omega = 1/T\Sigma_{t=2}^{T}V_{i_t}/1/T\Sigma_{t=1}^{T}V_{avg_t}$ The estimated velocity range information, including information on a largest velocity and a smallest velocity of the interfering vehicle in a range of the time corresponding to the TTC value, can be generated by following above formula, and it can be used for generating the potential interference prediction model. Thereafter, the potential interfering action, corresponding to a velocity of the interfering vehicle driving in front of the subject autonomous vehicle, can be predicted by using the potential interference prediction model.

After the potential interfering action is predicted, the computing device 100 may instruct the planning module 150 to generate updated optimized route information by modifying the current optimized route information, in order to evade the potential interfering action. As an example, if the potential interfering action indicates that the interfering vehicle may move slowly in front of the subject autonomous vehicle, in the same lane. In this case, the computing device 100 may instruct the planning module 150 to acquire lane average velocity information of at least one surrounding lane located in at least one of a left side and a right side of a current lane including the subject autonomous vehicle. Such lane average velocity information may have been acquired by using the cameras located between each of the sections, and transmitted from the center server 200 to the planning module 150, through the V2X communication module 130.

Thereafter, the computing device 100 may instruct the planning module 150 to modify the current optimized route information in order to add an evading action, to be executed in correspondence with the surrounding lane in order to evade the potential interfering action, by referring to the lane average velocity information, to thereby generate the updated optimized route information. The lane average velocity information may have been used for finding a better lane for passing. To explain such usage of the lane average velocity information, FIG. 5 will be referred to.

Figure 5:
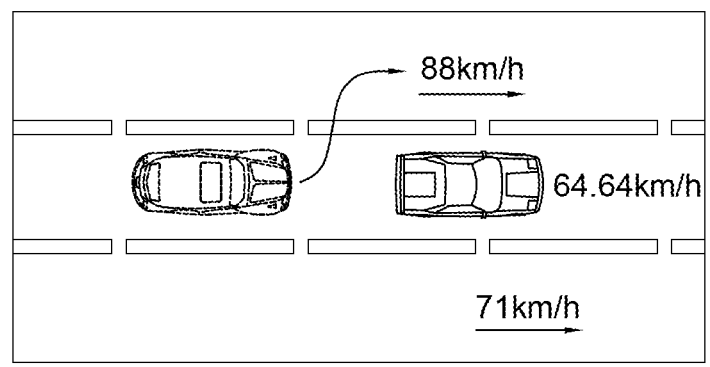
FIG. 5 is a drawing schematically illustrating how to modify current optimized route information to be used for performing the method for planning the autonomous driving by using the V2X communication and the image processing under the road circumstance where both the vehicles capable of the V2X communication and the vehicles incapable of the V2X communication exist in accordance with one example embodiment of the present disclosure.

FIG. 5 is a drawing schematically illustrating how to modify current optimized route information to be used for performing the method for planning the autonomous driving by using the V2X communication and the image processing under the road circumstance where both the vehicles capable of the V2X communication and the vehicles incapable of the V2X communication exist in accordance with one example embodiment of the present disclosure.

By referring to FIG. 5, it can be seen that an average velocity of a lane on the left is larger than that of a lane on the right. In this case, selecting the lane on the left will be more suitable for passing. Thus, the lane on the left will be selected, and the evading action by using the lane on the left will be added to the current optimized route information, to thereby generate the updated optimized route information.

By using such planning method, even under a road circumstance where both vehicles capable of the V2X communication and vehicles incapable of the V2X communication exist, the autonomous driving may be performed properly.

The present disclosure has an effect of providing a method for planning an autonomous driving by using a V2X communication and an image processing to allow the autonomous driving to be performed more safely.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for planning an autonomous driving by using a Vehicle-to-everything (V2X) communication and an image processing under a road circumstance where both vehicles capable of the V2X communication and vehicles incapable of the V2X communication exist, comprising steps of:
   (a) a computing device instructing a planning module to acquire recognition information on at least part of surrounding vehicles including at least part of (i) a first group including one or more first vehicles which are capable of a V2X communication and are located closer than a threshold distance from a subject autonomous vehicle corresponding to the computing device and (ii) a second group including one or more second vehicles which are incapable of the V2X communication and are located closer than the threshold distance from the subject autonomous vehicle, by interworking with at least one of a V2X communication module and an image processing module;
   (b) the computing device instructing the planning module to select at least one interfering vehicle among the surrounding vehicles, whose probability of obstructing the subject autonomous vehicle is larger than a threshold probability, by referring to a current optimized route information of the subject autonomous vehicle and the recognition information; and
   (c) the computing device instructing the planning module to generate a potential interference prediction model on the interfering vehicle by interworking with at least one of the V2X communication module and the image processing module, and to modify the current optimized route information in order to evade a potential interfering action of the interfering vehicle, which is estimated by using the potential interference prediction model, to thereby generate updated optimized route information of the subject autonomous vehicle;
   wherein, at the step of (a), the computing device instructs a 1-st neural network included in the image processing module to acquire at least one circumstance image, corresponding to at least one direction from the subject autonomous vehicle, through at least one camera installed to the subject autonomous vehicle, and to apply one or more 1-st neural network operations to the circumstance image, to thereby generate the recognition information and then to thereby transmit the recognition information to the planning module, wherein the recognition information includes at least part of (i) vehicle identifier information, (ii) vehicle exterior information, and (iii) vehicle relative location information from the subject autonomous vehicle;
   wherein, at the step of (b), the computing device instructs the planning module to (i) generate a scheduled direction vector by using scheduled direction information on a direction to which the subject autonomous vehicle is planned to move in a threshold time and generate one or more relative location vectors by using the vehicle relative location information corresponding to at least part of the surrounding vehicles, (ii) generate each of similarity scores between the scheduled direction vector and each of the relative location vectors, and (iii) select at least one specific surrounding vehicle, among the surrounding vehicles, as the interfering vehicle, whose specific similarity score is larger than a threshold similarity score.

2. The method of claim 1, wherein, at the step of (b), the computing device instructs the planning module to select at least one specific surrounding vehicle, whose corresponding partial image is located in a current lane region, corresponding to a current lane of a road including the subject autonomous vehicle, of the circumstance image, as the interfering vehicle, by referring to information on locations, of bounding boxes including the surrounding vehicles, on the circumstance image, which is acquired by using the image processing module.

3. A method for planning an autonomous driving by using a Vehicle-to-everything (V2X) communication and an image processing under a road circumstance where both vehicles capable of the V2X communication and vehicles incapable of the V2X communication exist, comprising steps of:
   (a) a computing device instructing a planning module to acquire recognition information on at least part of surrounding vehicles including at least part of (i) a first group including one or more first vehicles which are capable of a V2X communication and are located closer than a threshold distance from a subject autonomous vehicle corresponding to the computing device and (ii) a second group including one or more second vehicles which are incapable of the V2X communication and are located closer than the threshold distance from the subject autonomous vehicle, by interworking with at least one of a V2X communication module and an image processing module;
   (b) the computing device instructing the planning module to select at least one interfering vehicle among the surrounding vehicles, whose probability of obstructing the subject autonomous vehicle is larger than a threshold probability, by referring to a current optimized route information of the subject autonomous vehicle and the recognition information; and
   (c) the computing device instructing the planning module to generate a potential interference prediction model on the interfering vehicle by interworking with at least one of the V2X communication module and the image processing module, and to modify the current optimized route information in order to evade a potential interfering action of the interfering vehicle, which is estimated by using the potential interference prediction model, to thereby generate updated optimized route information of the subject autonomous vehicle;
   wherein, at the step of (c), the computing device, if the interfering vehicle belongs to the second group, (i) instructs the image processing module (i-1) to acquire a modeling image including the interfering vehicle through at least one camera installed to the subject autonomous vehicle and (i-2) to apply one or more 2-nd neural network operations to the modeling image, to thereby generate acceleration capability information of the interfering vehicle, and then to thereby transmit the acceleration capability information to the planning module, and (ii) instructs the planning module to generate the potential interference prediction model by referring to the acceleration capability information and current velocity information of the interfering vehicle acquired by using at least one of the image processing module and the V2X communication module.

4. The method of claim 3, wherein, at the step of (c), the computing device instructs a 2-nd neural network included in the image processing module to apply one or more (2-1)-st neural network operations, among the 2-nd neural network operations, to the modeling image by additionally referring to a self-vehicle velocity information of the subject autonomous vehicle, to thereby generate (i) relative velocity information of the interfering vehicle in relation to the subject autonomous vehicle, (ii) category information corresponding to a class of the interfering vehicle, and (iii) acceleration variable information corresponding to at least part of a mass and a volume of the interfering vehicle, and instructs the 2-nd neural network to apply one or more (2-2)-nd neural network operations, among the 2-nd neural network operations, to a concatenated vector including the relative velocity information, the category information and the acceleration variable information as its components, to thereby generate the acceleration capability information of the interfering vehicle.

5. The method of claim 4, wherein, at the step of (c), the computing device instructs the 2-nd neural network to apply the (2-2)-nd neural network operations to the concatenated vector, further including current section average velocity information on an average velocity of vehicles in a current section of a road where the surrounding vehicles and the subject autonomous vehicle are driving currently, to thereby generate the acceleration capability information.

6. The method of claim 3, wherein the computing device instructs the planning module to generate the potential interference prediction model by referring to the acceleration capability information and the current velocity information, generated by referring to velocity ratio information of the interfering vehicle and current section average velocity information, wherein the velocity ratio information has been generated by comparing each of average velocities for each of past sections of a road, where the surrounding vehicles and the subject autonomous vehicle have been driving, with each of velocities of the interfering vehicle in each of the past sections, and transmitted from a center server to the V2X communication module, and the current section average velocity information has been generated by calculating an average velocity of vehicles in a current section of a road where the surrounding vehicles and the subject autonomous vehicle are driving currently, and transmitted from the center server to the V2X communication module.

7. The method of claim 3, wherein the computing device instructs the 2-nd neural network to apply the 2-nd neural network operations to the modeling image, to thereby generate the current velocity information along with the acceleration capability information and then to thereby transmit the current velocity information and the acceleration capability information to the planning module, and instructs the planning module to generate the potential interference prediction model by referring to the current velocity information and the acceleration capability information.

8. The method of claim 3, wherein the computing device instructs the planning module to generate estimated velocity range information by referring to (i) a TTC value corresponding to a time for the subject autonomous vehicle to evade the potential interfering action, (ii) the acceleration capability information and (iii) the current velocity information, to thereby generate the potential interference prediction model including the estimated velocity range information.

9. A method for planning an autonomous driving by using a Vehicle-to-everything (V2X) communication and an image processing under a road circumstance where both vehicles capable of the V2X communication and vehicles incapable of the V2X communication exist, comprising steps of:

(a) a computing device instructing a planning module to acquire recognition information on at least part of surrounding vehicles including at least part of (i) a first group including one or more first vehicles which are capable of a V2X communication and are located closer than a threshold distance from a subject autonomous vehicle corresponding to the computing device and (ii) a second group including one or more second vehicles which are incapable of the V2X communication and are located closer than the threshold distance from the subject autonomous vehicle, by interworking with at least one of a V2X communication module and an image processing module;

(b) the computing device instructing the planning module to select at least one interfering vehicle among the surrounding vehicles, whose probability of obstructing the subject autonomous vehicle is larger than a threshold probability, by referring to a current optimized route information of the subject autonomous vehicle and the recognition information; and (c) the computing device instructing the planning module to generate a potential interference prediction model on the interfering vehicle by interworking with at least one of the V2X communication module and the image processing module, and to modify the current optimized route information in order to evade a potential interfering action of the interfering vehicle, which is estimated by using the potential interference prediction model, to thereby generate updated optimized route information of the subject autonomous vehicle;

wherein, at the step of (c), the computing device, if the interfering vehicle belongs to the second group, instructs the V2X communication module to (i) acquire (i-1) acceleration capability information of the interfering vehicle, (i-2) velocity ratio information of the interfering vehicle generated by comparing each of average velocities for each of past sections of a road, where the surrounding vehicles and the subject autonomous vehicle have been driving, with each of velocities of the interfering vehicle in each of the past sections, and (i-3) current section average velocity information generated by calculating an average velocity of vehicles in the current section, from the center server, (ii) generate current velocity information of the interfering vehicle by referring to the velocity ratio information and the current section average velocity information, and (iii) generate the potential interference prediction model by referring to the current velocity information and the acceleration capability information.

10. The method of claim 1, wherein, at the step of (c), the computing device, if the interfering vehicle belongs to the first group, instructs the V2X communication module to acquire scheduled route information of the interfering vehicle by communicating with the interfering vehicle, and instructs the planning module to generate the potential interference prediction model by referring to the scheduled route information.

11. The method of claim 1, wherein, at the step of (c), the computing device instructs the planning module to acquire lane average velocity information of at least one surrounding lane located in at least one of a left side and a right side of a current lane including the subject autonomous vehicle, and to modify the current optimized route information in order to add an evading action, to be executed in correspondence with the surrounding lane in order to evade the potential interfering action, by referring to the lane average velocity information, to thereby generate the updated optimized route information.

12. A computing device for planning an autonomous driving by using a Vehicle-to-everything (V2X) communication and an image processing under a road circumstance where both vehicles capable of the V2X communication and vehicles incapable of the V2X communication exist, comprising:
at least one memory that stores instructions; and
at least one processor configured to execute the instructions to perform processes of: (I) instructing a planning module to acquire recognition information on at least part of surrounding vehicles including at least part of (i) a first group including one or more first vehicles which are capable of a V2X communication and are located closer than a threshold distance from a subject autonomous vehicle corresponding to the computing device and (ii) a second group including one or more second vehicles which are incapable of the V2X communication and are located closer than the threshold distance from the subject autonomous vehicle, by interworking with at least one of a V2X communication module and an image processing module; (II) instructing the planning module to select at least one interfering vehicle among the surrounding vehicles, whose probability of obstructing the subject autonomous vehicle is larger than a threshold probability, by referring to a current optimized route information of the subject autonomous vehicle and the recognition information; and (III) instructing the planning module to generate a potential interference prediction model on the interfering vehicle by interworking with at least one of the V2X communication module and the image processing module, and to modify the current optimized route information in order to evade a potential interfering action of the interfering vehicle, which is estimated by using the potential interference prediction model, to thereby generate updated optimized route information of the subject autonomous vehicle;
wherein, at the process of (I), the processor instructs a 1-st neural network included in the image processing module to acquire at least one circumstance image, corresponding to at least one direction from the subject autonomous vehicle, through at least one camera installed to the subject autonomous vehicle, and to apply one or more 1-st neural network operations to the circumstance image, to thereby generate the recognition information and then to thereby transmit the recognition information to the planning module, wherein the recognition information includes at least part of (i) vehicle identifier information, (ii) vehicle exterior information, and (iii) vehicle relative location information from the subject autonomous vehicle;
wherein, at the process of (II), the processor instructs the planning module to (i) generate a scheduled direction vector by using scheduled direction information on a direction to which the subject autonomous vehicle is planned to move in a threshold time and generate one or more relative location vectors by using the vehicle relative location information corresponding to at least part of the surrounding vehicles, (ii) generate each of similarity scores between the scheduled direction vector and each of the relative location vectors, and (iii) select at least one specific surrounding vehicle, among the surrounding vehicles, as the interfering vehicle, whose specific similarity score is larger than a threshold similarity score.

13. The computing device of claim 12, wherein, at the process of (II), the processor instructs the planning module to select at least one specific surrounding vehicle, whose corresponding partial image is located in a current lane region, corresponding to a current lane of a road including the subject autonomous vehicle, of the circumstance image, as the interfering vehicle, by referring to information on locations, of bounding boxes including the surrounding vehicles, on the circumstance image, which is acquired by using the image processing module.

14. A computing device for planning an autonomous driving by using a Vehicle-to-everything (V2X) communication and an image processing under a road circumstance where both vehicles capable of the V2X communication and vehicles incapable of the V2X communication exist, comprising:
at least one memory that stores instructions; and
at least one processor configured to execute the instructions to perform processes of: (I) instructing a planning module to acquire recognition information on at least part of surrounding vehicles including at least part of (i) a first group including one or more first vehicles which are capable of a V2X communication and are located closer than a threshold distance from a subject autonomous vehicle corresponding to the computing device and (ii) a second group including one or more second vehicles which are incapable of the V2X communication and are located closer than the threshold distance from the subject autonomous vehicle, by interworking with at least one of a V2X communication module and an image processing module; (II) instructing the planning module to select at least one interfering vehicle among the surrounding vehicles, whose probability of obstructing the subject autonomous vehicle is larger than a threshold probability, by referring to a current optimized route information of the subject autonomous vehicle and the recognition information; and (III) instructing the planning module to generate a potential interference prediction model on the interfering vehicle by interworking with at least one of the V2X communication module and the image processing module, and to modify the current optimized route information in order to evade a potential interfering action of the interfering vehicle, which is estimated by using the potential interference prediction model, to thereby generate updated optimized route information of the subject autonomous vehicle;
wherein, at the process of (III), the processor, if the interfering vehicle belongs to the second group, (i) instructs the image processing module (i-1) to acquire a modeling image including the interfering vehicle through at least one camera installed to the subject autonomous vehicle and (i-2) to apply one or more 2-nd neural network operations to the modeling image, to thereby generate acceleration capability information of the interfering vehicle, and then to thereby transmit the acceleration capability information to the planning module, and (ii) instructs the planning module to generate the potential interference prediction model by referring to the acceleration capability information and current velocity information of the interfering vehicle acquired by using at least one of the image processing module and the V2X communication module.

15. The computing device of claim 14, wherein, at the process of (III), the processor instructs a 2-nd neural network included in the image processing module to apply one or more (2-1)-st neural network operations, among the 2-nd neural network operations, to the modeling image by additionally referring to a self-vehicle velocity information of the subject autonomous vehicle, to thereby generate (i) relative velocity information of the interfering vehicle in relation to the subject autonomous vehicle, (ii) category information corresponding to a class of the interfering vehicle, and (iii) acceleration variable information corresponding to at least part of a mass and a volume of the interfering vehicle, and instructs the 2-nd neural network to apply one or more (2-2)-nd neural network operations, among the 2-nd neural network operations, to a concatenated vector including the relative velocity information, the category information and the acceleration variable information as its components, to thereby generate the acceleration capability information of the interfering vehicle.

16. The computing device of claim 15, wherein, at the process of (III), the processor instructs the 2-nd neural network to apply the (2-2)-nd neural network operations to the concatenated vector, further including current section average velocity information on an average velocity of vehicles in a current section of a road where the surrounding vehicles and the subject autonomous vehicle are driving currently, to thereby generate the acceleration capability information.

17. The computing device of claim 14, wherein the processor instructs the planning module to generate the potential interference prediction model by referring to the acceleration capability information and the current velocity information, generated by referring to velocity ratio information of the interfering vehicle and current section average velocity information, wherein the velocity ratio information has been generated by comparing each of average velocities for each of past sections of a road, where the surrounding vehicles and the subject autonomous vehicle have been driving, with each of velocities of the interfering vehicle in each of the past sections, and transmitted from a center server to the V2X communication module, and the current section average velocity information has been generated by calculating an average velocity of vehicles in a current section of a road where the surrounding vehicles and the subject autonomous vehicle are driving currently, and transmitted from the center server to the V2X communication module.

18. The computing device of claim 14, wherein the processor instructs the 2-nd neural network to apply the 2-nd neural network operations to the modeling image, to thereby generate the current velocity information along with the acceleration capability information and then to thereby transmit the current velocity information and the acceleration capability information to the planning module, and instructs the planning module to generate the potential interference prediction model by referring to the current velocity information and the acceleration capability information.

19. The computing device of claim 14, wherein the processor instructs the planning module to generate estimated velocity range information by referring to (i) a TTC value corresponding to a time for the subject autonomous vehicle to evade the potential interfering action, (ii) the acceleration capability information and (iii) the current velocity information, to thereby generate the potential interference prediction model including the estimated velocity range information.

20. A computing device for planning an autonomous driving by using a Vehicle-to-everything (V2X) communication and an image processing under a road circumstance where both vehicles capable of the V2X communication and vehicles incapable of the V2X communication exist, comprising:
at least one memory that stores instructions; and
at least one processor configured to execute the instructions to perform processes of: (I) instructing a planning module to acquire recognition information on at least part of surrounding vehicles including at least part of (i) a first group including one or more first vehicles which are capable of a V2X communication and are located closer than a threshold distance from a subject autonomous vehicle corresponding to the computing device and (ii) a second group including one or more second vehicles which are incapable of the V2X communication and are located closer than the threshold distance from the subject autonomous vehicle, by interworking with at least one of a V2X communication module and an image processing module; (II) instructing the planning module to select at least one interfering vehicle among the surrounding vehicles, whose probability of obstructing the subject autonomous vehicle is larger than a threshold probability, by referring to a current optimized route information of the subject autonomous vehicle and the recognition information; and (III) instructing the planning module to generate a potential interference prediction model on the interfering vehicle by interworking with at least one of the V2X communication module and the image processing module, and to modify the current optimized route information in order to evade a potential interfering action of the interfering vehicle, which is estimated by using the potential interference prediction model, to thereby generate updated optimized route information of the subject autonomous vehicle;
wherein, at the process of (III), the processor, if the interfering vehicle belongs to the second group, instructs the V2X communication module to (i) acquire (i-1) acceleration capability information of the interfering vehicle, (i-2) velocity ratio information of the interfering vehicle generated by comparing each of average velocities for each of past sections of a road, where the surrounding vehicles and the subject autonomous vehicle have been driving, with each of velocities of the interfering vehicle in each of the past sections, and (i-3) current section average velocity information generated by calculating an average velocity of vehicles in the current section, from the center server, (ii) generate current velocity information of the interfering vehicle by referring to the velocity ratio information and the current section average velocity information, and (iii) generate the potential interference prediction model by referring to the current velocity information and the acceleration capability information.

21. The computing device of claim 12, wherein, at the process of (III), the processor, if the interfering vehicle belongs to the first group, instructs the V2X communication module to acquire scheduled route information of the interfering vehicle by communicating with the interfering vehicle, and instructs the planning module to generate the potential interference prediction model by referring to the scheduled route information.

22. The computing device of claim 12, wherein, at the process of (III), the processor instructs the planning module to acquire lane average velocity information of at least one surrounding lane located in at least one of a left side and a right side of a current lane including the subject autonomous vehicle, and to modify the current optimized route information in order to add an evading action, to be executed in correspondence with the surrounding lane in order to evade the potential interfering action, by referring to the lane average velocity information, to thereby generate the updated optimized route information.

* * * * *